Nov. 15, 1938.

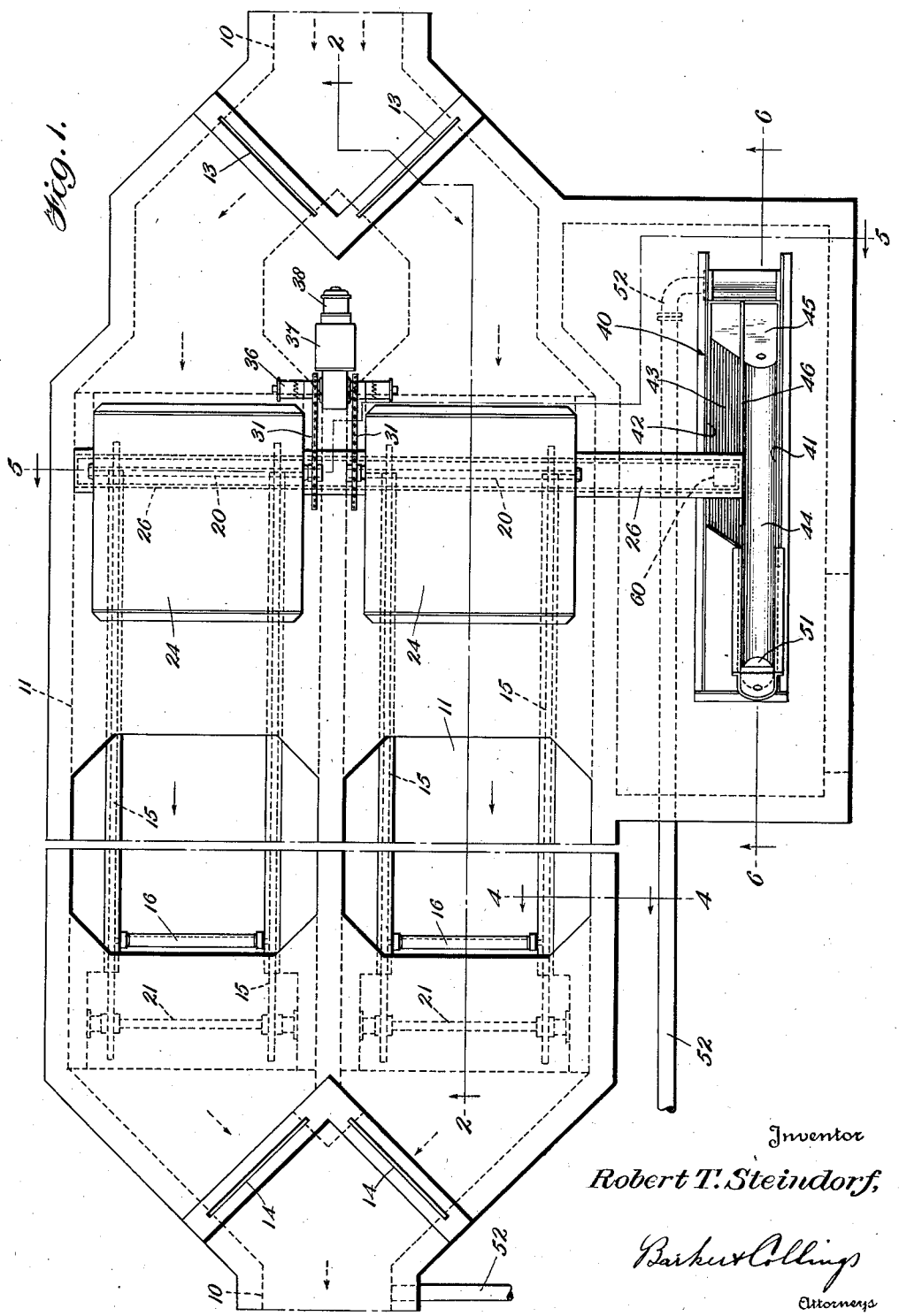

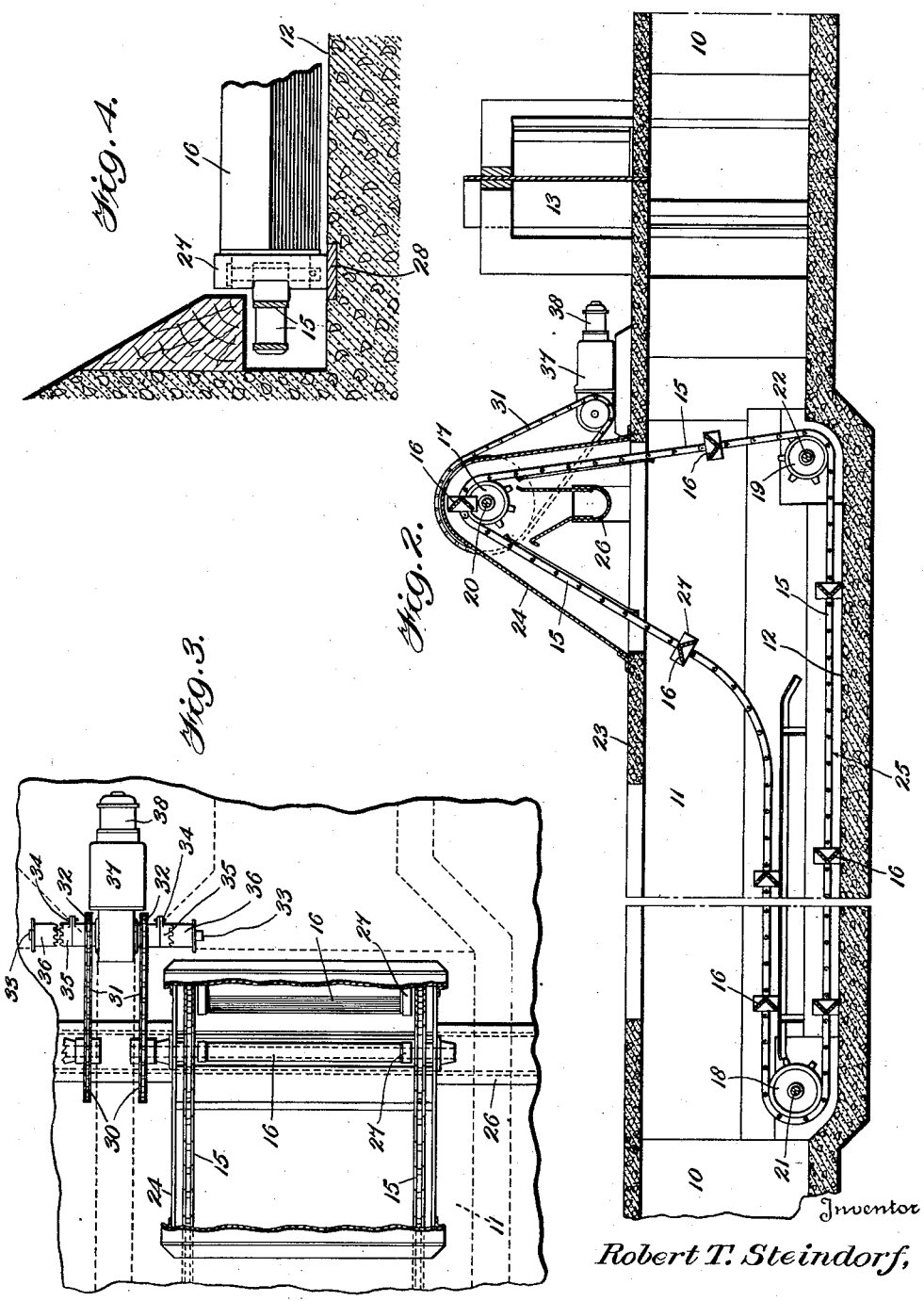

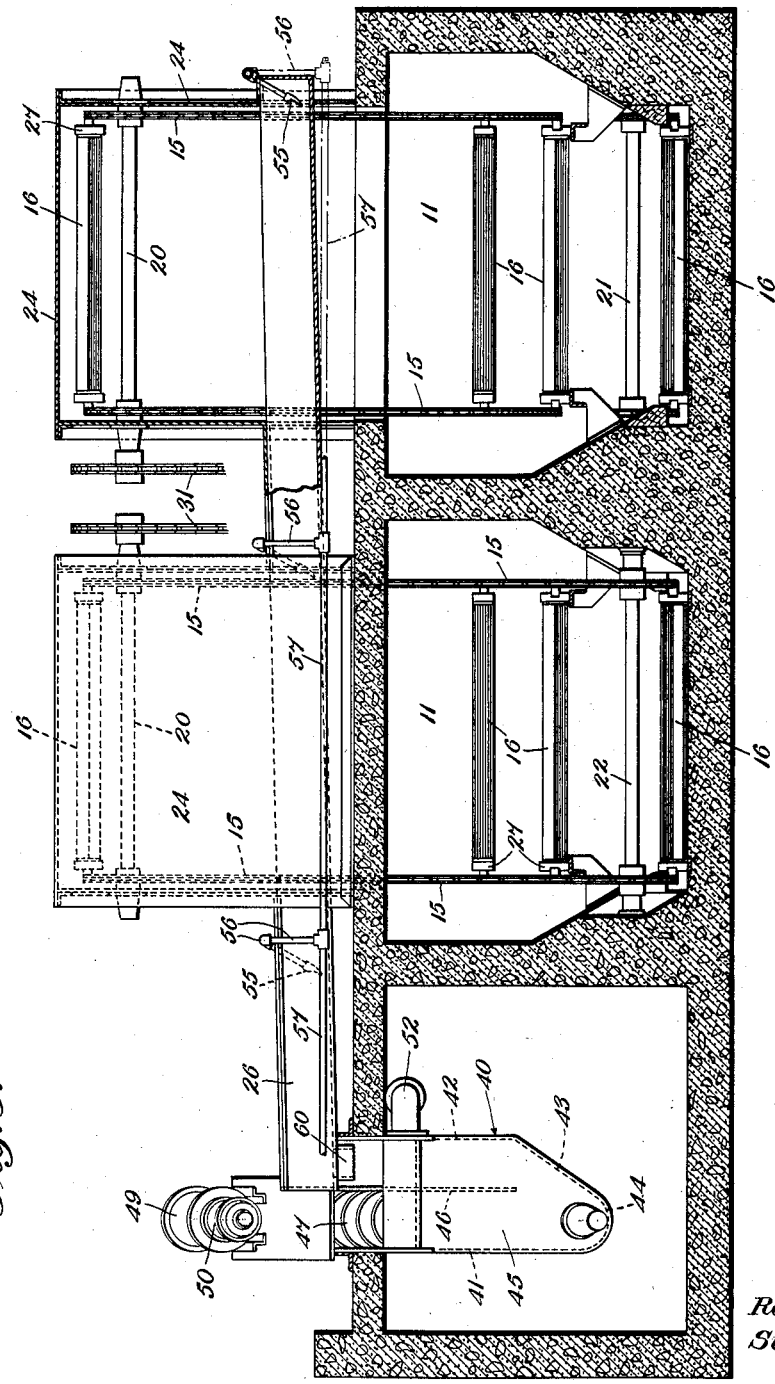

R. T. STEINDORF 2,136,400

SEDIMENTATION APPARATUS

Filed Aug. 12, 1936

Inventor
Robert T. Steindorf,

By Barker & Collings
Attorneys

Patented Nov. 15, 1938

2,136,400

UNITED STATES PATENT OFFICE 2,136,400

SEDIMENTATION APPARATUS

Robert T. Steindorf, Milwaukee, Wis., assignor to Chain Belt Company, Milwaukee, Wis., a corporation of Wisconsin Application August 12, 1936, Serial No. 95,665

10 Claims. (Cl. 210—3)

This invention relates to sedimentation apparatus, and has for one of its objects to provide apparatus of this character and in which a liquid carrying organic and inorganic solids is acted upon to cause settlement of the inorganics, along with a minimum of the organics, subsequent to which such organics are efficiently separated from the inorganics.

A further object of the invention is to provide sedimentation apparatus in which the organic and inorganic solids may be continuously or intermittently removed from the settling chamber as they deposit on the floor thereof, and transferred to a washing and separating chamber or zone exterior of the settling chamber wherein they are washed, agitated, segregated, and discharged.

A further object of the invention is to provide sedimentation apparatus which includes a settling chamber disposed in a flowing stream of liquid carrying organic and inorganic solids in suspension, from which chamber the settled solids are removed to an extraneous chamber or zone in which they are treated to segregate the organics from the inorganics, after which the organics are returned to the flowing stream beyond the settling chamber and segregating zone.

A still further object of the invention is to generally improve the apparatus whereby the settled solids are transferred from the settling chamber, and the organics segregated from the inorganics.

With the above and other objects in view which will appear as the description proceeds, the invention consists in the novel details of construction, and combinations and arrangements of parts, more fully hereinafter described and particularly pointed out in the appended claims.

In the accompanying drawings forming a part of this specification in which like reference characters designate like parts in all the views:

Figure 1 is a plan view of one form of the invention, partly broken away, and with certain of the parts omitted for the sake of clearness;

Fig. 2 is a longitudinal sectional view, taken approximately on the plane indicated by the line 2—2 of Fig. 1;

Fig. 3 is an enlarged fragmentary plan view, partly broken away, of certain of the parts shown in Figs. 1 and 2;

Fig. 4 is an enlarged detail cross sectional view, taken on the plane indicated by the line 4—4 of Fig. 1, looking in the direction of the arrows;

Fig. 5 is a cross sectional view taken approximately on the planes indicated by the line 5—5 of Fig. 1.

Figure 6:
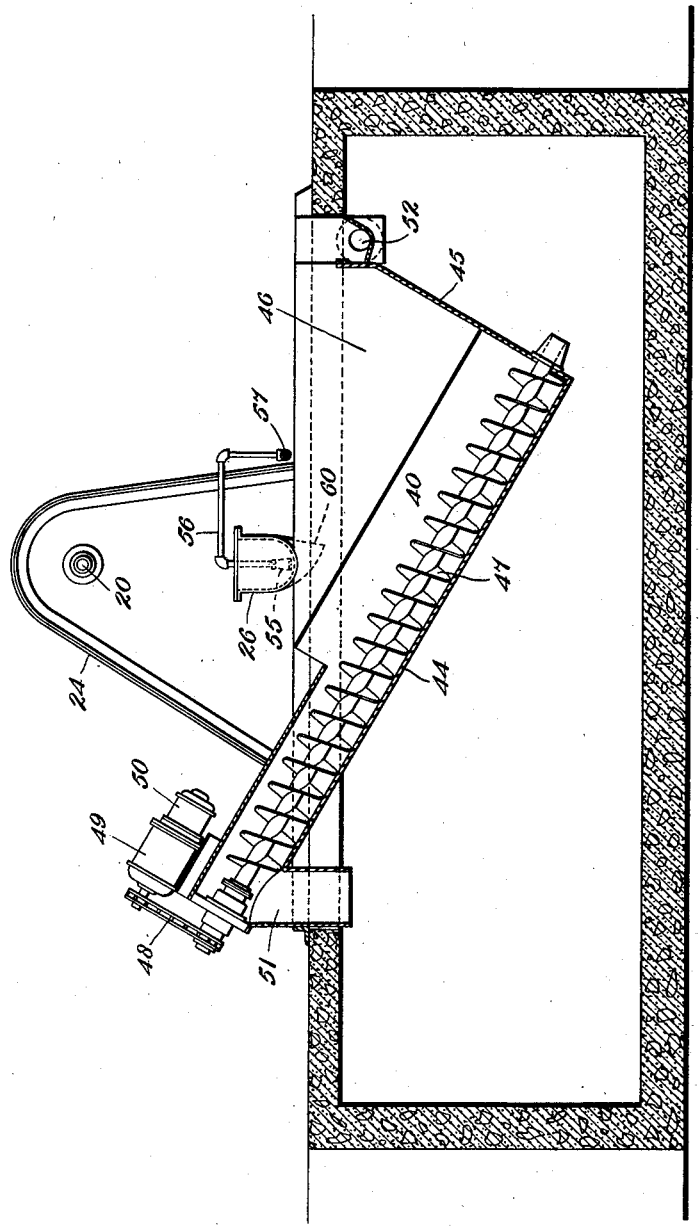
Fig. 6 is a longitudinal sectional view through the solids washing and segregating chamber and apparatus, taken approximately on the plane indicated by the line 6—6 of Fig. 1.

In the said drawings, 10 indicates a conduit through which the liquid carrying the organic and inorganic solids in suspension may flow from right to left, as viewed in Fig. 1, and which at any suitable point is provided with one or more sedimentation chambers 11. These chambers may be of a construction well-known in sewage disposal work, and provide a cross sectional area for the flowing stream which is substantially greater than that of the conduit 10, so that the rate of flow within the chambers will be materially reduced, and as a consequence the heavier suspended solids will settle to the floor 12 of the said chambers. In the present instance two sedimentation chambers 11 have been illustrated, and entry of the liquid thereto may be controlled by suitable gates 13 at the intake end of the chambers, while discharge of the liquid may likewise be controlled by similar gates 14 at the discharge end. By suitable manipulation of these inlet and discharge gates either chamber may be cut out of operation for repairs or other purposes without disturbing the operation of the other; and by varying the position of the discharge gates, the velocity of the liquid through the chambers 11, and its detention time therein, may be varied to control the separation of the inorganics from the organics. Such control is of practical importance, in that if the detention period is too long an undue amount of organics will settle and commingle with the inorganics, resulting in a heavier load of organics to be later washed out, while too short a detention time will permit inorganics or grit to be carried over into other parts of the plant, where they may interfere with the process of recovery of the organics.

In each chamber there is provided means for collecting the solids as they settle at the chamber floor and elevating them to a point above the liquid level, such means comprising endless bucket conveyors consisting of the spaced strands of chain 15 having mounted between them at suitable longitudinal intervals the tranversely extending buckets 16 which are preferably substantially V-shaped in cross section, as clearly shown in Fig. 2. The chains 15 are trained about sprockets 17, 18 and 19, carried respectively by the shafts 20, 21 and 22. As will be readily understood, the shaft 20 and its sprocket 17 are mounted above the roof 23 of the chamber 11 within a housing 24, while the shafts 21 and 22 together with their sprockets 18 and 19 are mounted adjacent the floor 12 of the said settling chamber, so as to provide a lower conveyor run 25 which traverses the chamber longitudinally in proximity to the said floor so that the buckets 16 may scrape the settled solids from the floor surface. As the said buckets pass around the sprockets 19 they then travel in a substantially vertical direction and serve to elevate the solids to a point above the liquid level. As they pass around the sprockets 17 they will discharge the solids into a transversely extending trough or conduit 26 which leads to the washing and segregating chamber, to be more fully hereinafter described.

As best shown in Fig. 4, each end of the buckets 16 is provided with a wear member 27 which slides upon a track member 28 embedded within the floor 12 of the chamber, and the said wear members 27 also constitute the means of attachment between the buckets 16 and the chains 15.

The sprockets 17 constitute the driving means for the chains 15 and in turn are driven by sprockets 30 carried by the shafts 20 exteriorly of the housings 24, which sprockets 30 have chains or belts 31 trained about them, as well as about the sprockets 32 loosely mounted upon shafts 33 and connected by a shear pin mechanism 34 to a clutch member 35, also loosely mounted upon the said shafts 33. The said clutch members are adapted to be engaged with and disengaged from companion clutch members 36 splined upon the shafts 33 and the said shafts are directly driven from a suitable speed reducing gearing 37 driven by an electric or other motor 38. (See Figs. 1, 2 and 3).

The solids washing and separating chamber and apparatus are located outside of the sedimentation chambers and as best shown in Figs. 1, 5 and 6, comprise a receptacle 40 preferably made of sheet metal and supported by an extension of the concrete work of the sedimentation chambers. The said receptacle or chamber 40 comprises the spaced vertical side walls 41 and 42, the latter of which is provided with a lower inclined portion 43 which is connected with the wall 41 by the curved bottom wall 44. As best shown in Fig. 6, this bottom wall is also inclined in a plane at right angles to the inclination of the wall 42. The receptacle 40 also has an end wall 45, as well as a vertical baffle 46, disposed intermediate the upper portions of the side walls 41 and 42.

Disposed within the chamber 40 in substantially parallel cooperative relation with the bottom wall 44, is a screw or worm conveyor 47 which is driven by means of chain and sprocket drive 48 from suitable speed reducing gearing 49 driven by a motor 50. The bottom wall 44 of the receptacle chamber 40 is provided at the upper end of the said screw conveyor 47 with a discharge passage 51 for the inorganic solids and at the opposite end of the chamber 40 there is provided an outlet 52 for the liquid and organic solids which outlet conduit preferably extends back to the main conduit 10, entering the same at a point beyond the sedimentation chambers 11, so as to discharge the organics back into the flowing stream at a point beyond the zone of recovery of the inorganics.

The trough or conduit 26 which receives the solids from the buckets 16 of the conveyors, extends transversely of the apparatus in a position beneath the shafts 20 to catch the solids and such liquid as may unavoidably be elevated therewith by the buckets as the latter pass over the upper sprockets 17. As best illustrated in Fig. 5, the said trough or conduit 26 is inclined downwardly toward the washing and separating chamber 40 so that the solids will tend to flow from right to left, as viewed in Fig. 5. In order to assist in this movement wash liquid is preferably sprayed into the trough or conduit 26 at suitable points by means of spray nozzles 55 supplied by pipes 56 from a liquid supply main 57.

After the solids have settled in the sedimentation tanks 11 and have been collected by the traveling buckets 16, elevated thereby, and discharged into the trough or conduit 26, they will be transferred thereby with the assistance of the wash liquid spray from nozzles 55, to the outlet 60 of the said trough 26 which is located intermediate the side wall 42 and the baffle 46 of the washing and separating chamber. Falling by gravity from the said discharge outlet 60 they will be deflected by the inclined portion 43 of wall 42 to the worm or screw 47 which member will agitate the solids and the wash liquid to cause separation of the heavier inorganic solids from the lighter organics, as will be readily understood. The organics will rise with the wash liquid and flow through the outlet 52 back to the conduit 10, while the inorganics will be moved upwardly by the screw 47 along the curved bottom wall 44 of the chamber 40 and discharged through the outlet 51 into any suitable receptacle placed below the said outlet. The inorganics are thus continuously separated from the organics and recovered, while the latter are returned to the flowing stream for such further treatment as may be desired.

The grit removed from sewage varies considerably in different localities, and some kinds are more difficult to clean than others. By locating the washing and separating chamber outside the settling chamber, not only may fresh water be employed for the washing, but the operation may be better regulated to secure a very clean grit, free from organics. It is also more accessible for inspection and replacement of wearing parts. In the construction above described, the speed of the washer screw may be readily adjusted to obtain the correct action for any condition and/or type of grit, and the amount of clean water supplied can be closely controlled.

While one form of the invention has been illustrated and described it is obvious that those skilled in the art may vary the details of construction as well as the precise arrangement of parts without departing from the spirit of the invention, and therefore it is not wished to be limited to the above disclosure except as may be required by the claims.

What is claimed is:

1. In sedimentation apparatus, the combination of a settling chamber for receiving liquid carrying organic and inorganic solids; a washing and separating chamber for the solids adjacent but separated from said settling chamber; means for collecting and withdrawing the settled solids from the liquid in said settling chamber; means arranged to receive the withdrawn solids from said collecting means and to conduct them to said washing and separating chamber; means for supplying wash liquid to the solids during such transfer; and means in said washing chamber for agitating said solids to segregate the organics from the inorganics, and discharging the latter.

2. In sedimentation apparatus, the combination of a settling chamber disposed in a flowing stream of liquid carrying inorganic and putrescible organic solids; a washing and separating chamber adjacent said settling chamber out of the line of flow; means for collecting the settled intermixed organic and inorganic solids from the floor of said settling chamber and withdrawing them from the liquid therein; means for receiving the withdrawn solids from said collecting means and conducting them to said washing and separating chamber; means for supplying wash liquid to said solids in said conducting means; means arranged to agitate the solids in said washing chamber to segregate the organics from the inorganics, and discharge the latter; and means for conducting the segregated organics back to the flowing stream beyond the zone of recovery of the inorganics.

3. In sedimentation apparatus, the combination of a settling chamber for receiving liquid carrying inorganic solids and putrescible organic solids which tend to adhere to said inorganics; a washing and separating chamber adjacent but separated from said settling chamber; conveyer means for collecting and withdrawing the settled solids from the liquid in said settling chamber; an inclined conduit above said settling chamber arranged to receive the withdrawn solids from said conveyer means and conduct them to said washing and separating chamber; means for introducing wash liquid into said conduit to assist in moving the solids therethrough; and means in said washing chamber for agitating the solids and wash liquid therein to segregate the organics from the inorganics.

4. In sedimentation apparatus, the combination of a settling chamber for receiving liquid carrying putrescible organic and inorganic solids; a washing and separating chamber for the solids adjacent but separated from said settling chamber; a bucket conveyer arranged to traverse the floor of said settling chamber to collect the settled solids therefrom, elevate them above the liquid level, and then discharge them; a conduit disposed to receive said solids from said conveyer and discharge them into said washing chamber; means for spraying wash liquid into said conduit to assist in moving the solids therethrough; and means in said washing chamber arranged to agitate said solids and wash liquid to segregate the organics from the inorganics, and discharge the latter.

5. In sedimentation apparatus, the combination of a settling chamber for receiving liquid carrying organic and inorganic solids; a washing and separating chamber for the solids adjacent but separated from said settling chamber; an endless conveyer having a horizontal run adjacent the floor of said settling chamber, and a vertical run adjacent one end of said chamber, said conveyer having buckets arranged during said horizontal run to scrape the settled solids from the floor of said chamber, and during said vertical run to elevate them above the liquid level; an inclined conduit above said liquid level disposed to receive said solids from said conveyer, and discharge them into said washing chamber; and means for agitating said solids in said washing chamber to segregate the organics from the inorganics.

6. In sedimentation apparatus, the combination of an elongated settling chamber for receiving liquid carrying organic and inorganic solids; a washing and separating chamber for said solids laterally adjacent but separated from said settling chamber; a conveyer having buckets arranged to longitudinally traverse the floor of said settling chamber to scrape the settled solids therefrom, and to move vertically at the end of said chamber to elevate said solids above the liquid level; a transverse conduit arranged to receive said solids from said conveyer buckets and discharge them into said washing chamber; means for spraying wash liquid into said conduit to assist in moving said solids therethrough; and means for agitating said solids in said washing chamber to segregate the organics from the inorganics.

7. In sedimentation apparatus, the combination of a settling chamber for receiving liquid carrying organic and inorganic solids; a washing and separating chamber for the solids adjacent said settling chamber, having vertical side walls, one having an inclined portion connected to the other by a curved inclined bottom wall; means for collecting the settled solids and transferring them from said settling chamber to said washing chamber adjacent the inclined side wall thereof; means for supplying wash liquid to said solids during said transfer; and a screw conveyer in said washing chamber extending along said bottom wall, for agitating the solids and wash liquid in said chamber to segregate the organics from the inorganics, and moving the latter upwardly along said inclined bottom wall to discharge the same.

8. In sedimentation apparatus, the combination of a settling chamber for receiving liquid carrying organic and inorganic solids; a washing and separating chamber for the solids adjacent said settling chamber, having vertical side walls, one having an inclined portion connected to the other by a curved inclined bottom wall; a vertical baffle parallel to and intermediate said side walls; means for collecting the settled solids and transferring them from said settling chamber to said washing chamber intermediate the inclined side wall thereof and said baffle; means for supplying wash liquid to said solids during said transfer; and a screw conveyer in said washing chamber extending along said bottom wall, for agitating the solids and wash liquid in said chamber to segregate the organics from the inorganics, and moving the latter upwardly along said inclined bottom wall to discharge the same.

9. Apparatus for washing and separating solids, comprising a longitudinally inclined elongated chamber having spaced side walls, a lower portion of one of which is transversely inclined and joined to the other side wall by a curved bottom wall, said chamber being adapted to receive intermixed solids of different kinds and a wash liquid; and a screw conveyer in said chamber extending along said bottom wall, for agitating the solids and wash liquid in the chamber to segregate the lighter from the heavier solids and moving the latter upwardly along said inclined bottom wall to discharge the same.

10. Apparatus for washing and separating solids, comprising a longitudinally inclined elongated chamber having spaced side walls, a lower portion of one of which is transversely inclined and joined to the other side wall by a curved bottom wall, said chamber being adapted to receive intermixed solids of different kinds and a wash liquid; a vertical baffle parallel to and intermediate said side walls; and a screw conveyer in said chamber extending along said bottom wall, for agitating the solids and wash liquid in the chamber to segregate the lighter from the heavier solids and moving the latter upwardly along said inclined bottom wall to discharge the same.

ROBERT T. STEINDORF.